Oct. 13, 1970 PE TSI CHU 3,534,362

TRANSLATOR CIRCUITS

Original Filed Aug. 21, 1963 2 Sheets-Sheet 1

Inventor
PE TSI CHU
By Philip M. Bolton
Attorney

TRANSLATOR CIRCUITS

Original Filed Aug. 21, 1963

Inventor
PE TSI CHU
By Philip M. Bolton
Attorney

United States Patent Office 3,534,362
Patented Oct. 13, 1970

3,534,362

TRANSLATOR CIRCUITS

Pe Tsi Chu, Antwerp, Belgium, assignor to International Standard Electric Corporation, New York, N.Y., a corporation of Delaware Original application Aug. 21, 1963, Ser. No. 305,524. Divided and this application Aug. 23, 1967, Ser. No. 671,523
Claims priority, application Netherlands, Sept. 25, 1962, 283,565
Int. Cl. H04l 3/02
U.S. Cl. 340—347 1 Claim

ABSTRACT OF THE DISCLOSURE

A translator circuit comprises $m$ cores and $p$ inputs for translating a numerical value in a constant weight binary code wherein each of the inputs is coupled to a fixed DC potential via a series circuit including a diode and $n$ windings which are wound on $n$ of said $m$ cores and that some of said windings are common to a plurality of said series circuits so that the total number of windings included in the translator circuit is considerably smaller than $pn$.

CROSS-REFERENCES TO RELATED APPLICATIONS

This is a division of application Ser. No. 303,524, filed Aug. 21, 1963, (now abandoned) the filing date being claimed for this application.

The present invention relates to lock-out and translator circuits. More particularly it relates to a lock-out circuit with $n$ inputs, wherein an input signal appearing at any input numbered K renders all input signals appearing on a higher numbered input inoperative, and, if it is not itself disabled by an input signal appearing on a lower numbered input, produces an output signal corresponding to said input numbered K.

Such a lock-out circuit is already known from the Belgian Pat. 596,196 (J. Masure 2).

It is an object of the present invention to provide a lock-out circuit of the above type using magnetic logic circuits of a particularly simple and advantageous nature.

Another object of the present invention is to provide a particularly simple translator circuit comprising $m$ magnetic cores and $p$ inputs for translating a numerical value in a binary code.

The present lock-out circuit is characterized in that it includes $n$ cores made in a magnetic material having a substantially rectangular hysteresis loop, a set winding and an inhibition winding being wound on each core, except the first core wherein no inhibition winding is wound, and that each of said $n$ inputs is connected on the one hand to one terminal of an input signal source and on the other hand to the commoned other terminals of the input signal sources via the series connection of a set winding, wound on the core associated to this input, and of the series connected inhibition windings wound on the cores which have a higher number than said core.

The present translator circuit is characterized in that said code is a constant weight binary code, that each of said inputs is coupled to a fixed DC potential via a series circuit including a diode and $n$ windings which are wound on $n$ of said $m$ cores and that some of said windings are common to a plurality of said series circuits so that the total number of windings included in the translator circuit is considerably smaller than $pn$.

The above mentioned and other objects and features of the invention will become more apparent and the invention itself will be best understood by referring to the following description of embodiments taken in conjunction with the accompanying drawings wherein.

The present lock-out circuit will be described in relation to a system for determining and selecting free aligned telecommunication channels in a time division multiplex telephone exchange, a system of this type being disclosed in the above mentioned Belgian Patent 596,196. A time division multiplex telephone exchange consists of a plurality of time division multiplex highways each offering $n$ time channels numbered 1 to $n$. A connection utilizing a single time slot, i.e. correspondingly numbered or aligned time channels, is made over at most $u$ cascaded highways.

To each highway is attributed one row of $n$ memory cells numbered 1 to $n$, each cell corresponding to the same numbered time channel on that highway and storing the free or busy condition of that channel. When one or more free time slots are to be selected on a set of $v$ cascaded highways, $v$ being inferior or equal to $u$, the $v$ corresponding rows of memory cells are addressed by a register and read out. The channel occupation information thus available is processed by a set of alignment coincidence gates numbered 1 to $n$, a signal appearing on each gate corresponding to a free $v$-channel time slot.

The present lock-out circuit is provided for the selection of one of $n=25$ possible free time slots and it includes 26 cores $C_1$ to $C_{26}$ made in a magnetic material having a substantially rectangular hysteresis loop. Before starting the detailed description of this circuit, it should be noted that the "mirror" symbol method of representation of the windings wound on these cores has been adopted in the figures. This method is well known in the art, particularly from the article entitled "Pulse switching circuits using magnetic cores" by M. Karnaugh, Proceedings of the IRE, vol. 43, number 5, p. 572 May 1955. This method is therefore not described in detail.

Figure 1:
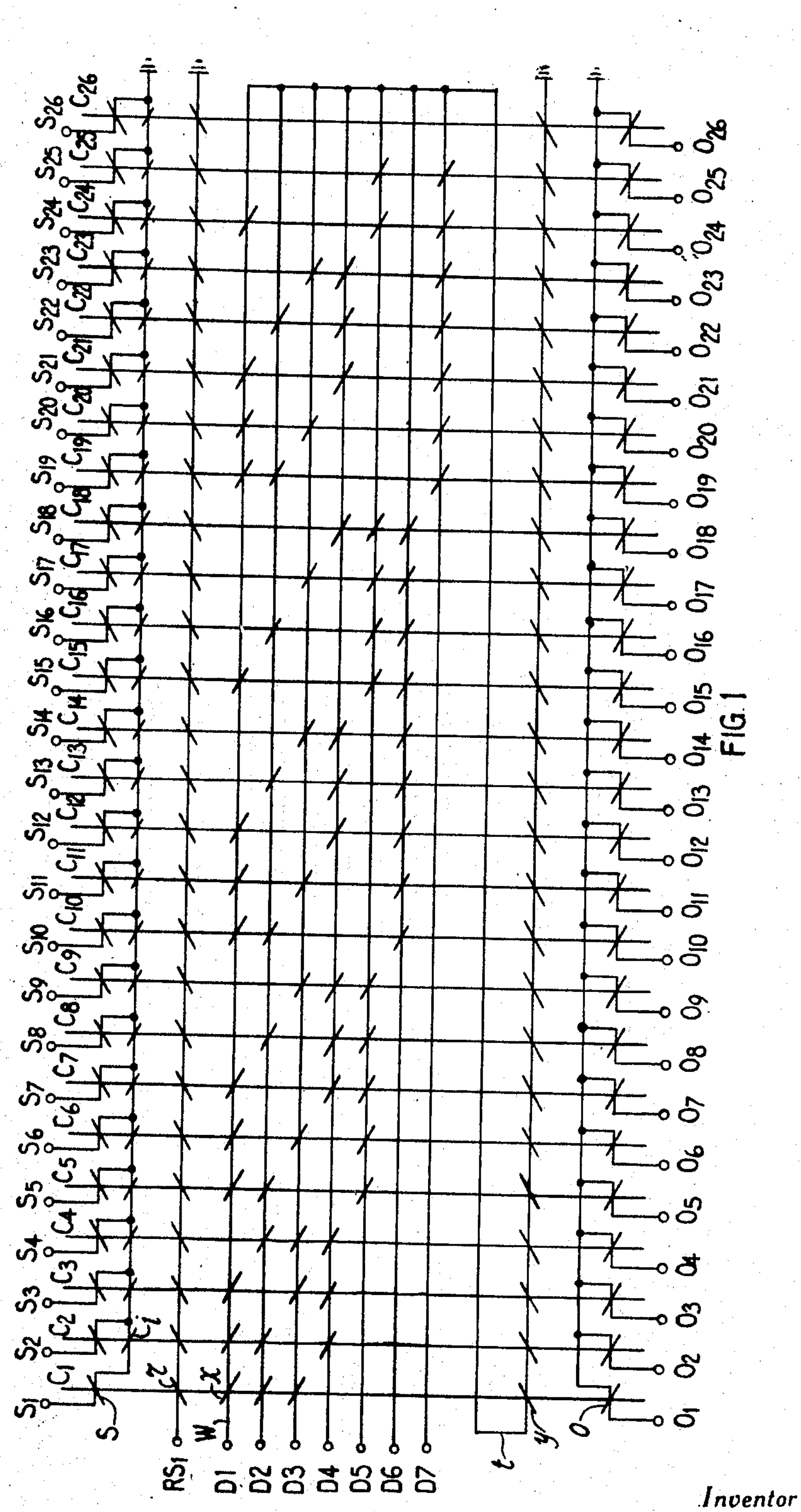
FIG. 1 shows a lock-out circuit, according to the present invention associated to a decoder circuit.

Principally referring to FIG. 1 and abstraction being made of the circuits connected to the inputs $D_1$ to $D_7$, on each core there are wound a set winding $s$, an inhibition winding $i$, an output winding O and a reset winding $r$. It should however be noted that on the first core no inhibition winding is wound. The set and the reset windings are wound in one sense, whereas the inhibition and the output windings are wound in the other sense.

The lock-out circuit is provided with 26 inputs $S_1$ to $S_{26}$. The inputs $S_1$ to $S_{25}$ are each connected to an output of one of the above alignment coincidence gates and since the output of one of these gates is activated when the corresponding time slot is free it may also be said that each of the inputs $S_1$ to $S_{25}$ is connected to one terminal of a signal source (not shown) which supplies only an active signal upon the corresponding time slot being free. In the present case the output signal supplied by each of these signal sources varies between 0 volt (busy) and −12 volts (free). The input $S_{26}$ is connected to one terminal of a signal source (not shown) which normally supplies an active signal of −12 volts. The other terminals of all the above signal sources are connected to ground and each of the above inputs $S_1$ to $S_{26}$ is connected to this ground via the series connection of a set winding, wound on the core associated to this input, and the series connected inhibition windings wound on the cores with a higher number. The reset windings $r$ are branched in series between the terminals of a reset source $RS_1$ which normally supplies a 0 volt pulse and which when activated supplies a 12 volts reset pulse. Hereby the one terminal of this source is grounded. The one ends of the output windings O are all connected to a common ground and the other ends of these output windings are indicated by $O_1$ to $O_{26}$.

The operation of the above lock-out circuit is as follows. Normally the cores $C_1$ to $C_{25}$ are in one remanent or reset condition and the input $S_{26}$ is activated. When one of the inputs $S_1$ to $S_{25}$ e.g. $S_3$ is activated due to the corresponding time slot being free, a current flows through the series circuit comprising the set winding wound on the associated core $C_3$ and the series connected inhibition windings wound on the cores $C_4$ to $C_{26}$. Supposing that none of the lower numbered inputs $S_1$ or $S_2$ is activated no current flows in the inhibition winding wound on the core $C_3$ so that this core will be brought in the opposite remanent or set condition and that an output signal will be produced in the output winding wound thereon. On the contrary, when for instance the input $S_2$ is activated while the input $S_1$ is not activated the core $C_2$ will be set whereas the core $C_3$ will remain in its reset condition. Generalizing, an input signal appearing at any input numbered K renders all input signals appearing on the higher numbered inputs inoperative i.e. prevents all the cores associated to the latter inputs from being set, and, if it is not itself disabled by an input signal appearing on a lower numbered input, produces an output signal in the output winding wound on the core numbered K.

As mentioned above, the input $S_{26}$ is normally activated so that a current normally flows in the set winding wound on core $C_{26}$. However, as soon as one of the inputs $S_1$ to $S_{25}$ is activated a current will also flow in the inhibition wound on this core $C_{26}$ so that the latter will remain in its reset condition. Hence, as long as a time slot is free the output $O_{26}$ is not activated and only when all the time slots are busy the output $O_{26}$ is activated.

Figure 2:
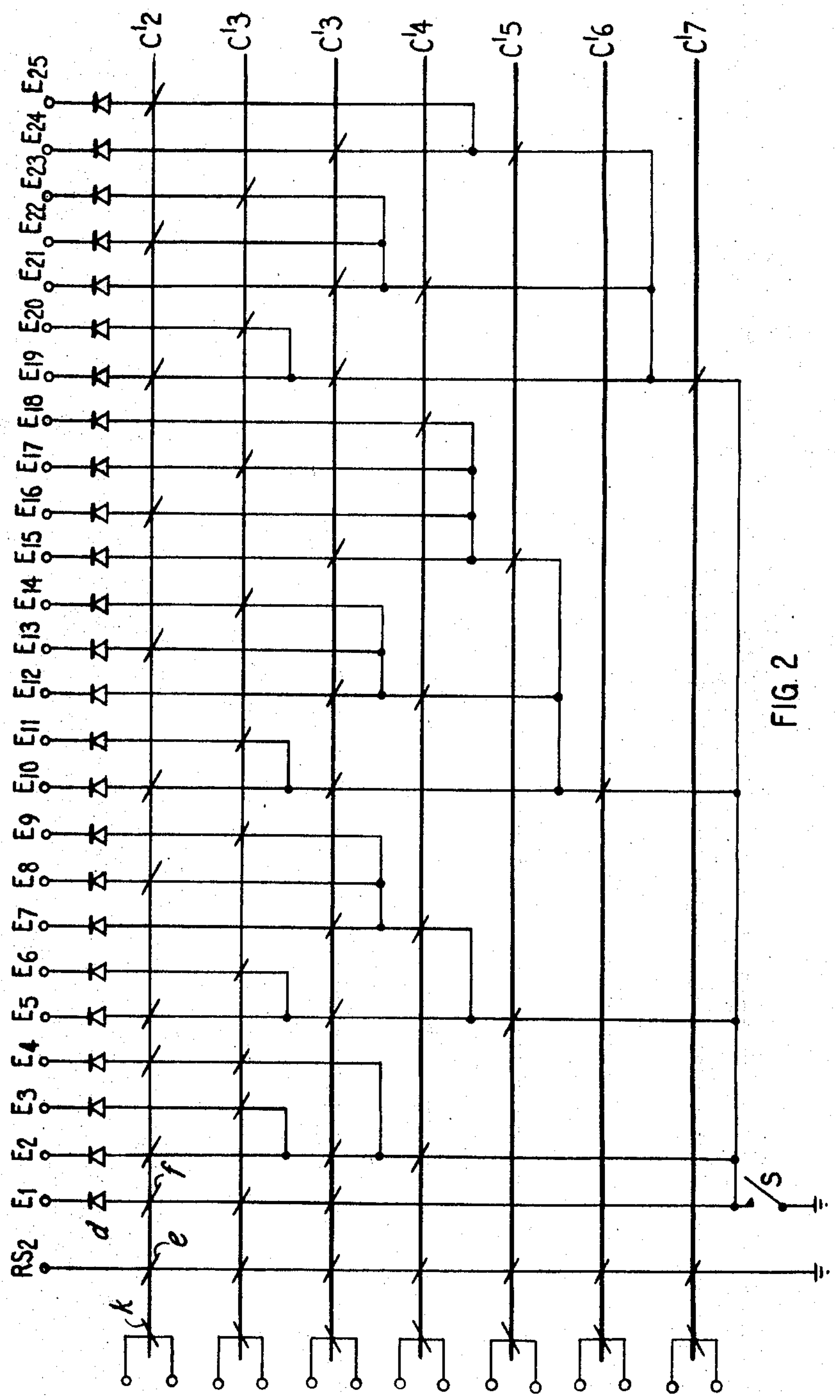
FIG. 2 represents a translator circuit according to the present invention.

The above output terminals $O_1$ to $O_{25}$ of the lock-out circuit are connected to the inputs $E_1$ to $E_{25}$ respectively of a translator or encoder circuit shown in FIG. 2, whereas the above output terminal $O_{26}$ is connected to the input of a bistate circuit via a diode *d'* (both not shown) included in a register circuit (not shown). This translator circuit is adapted for translating a numerical value 1 to 25 in a constant weight binary code, namely in a 3-out-of-7 binary code. The relation between these values and this code is given by the following scheme:

| | | | |
|---|---|---|---|
| 1 | 1110000 | 14 | 0011010 |
| 2 | 1101000 | 15 | 1000110 |
| 3 | 1011000 | 16 | 0100110 |
| 4 | 0111000 | 17 | 0010110 |
| 5 | 1100100 | 18 | 0001110 |
| 6 | 1010100 | 19 | 1100001 |
| 7 | 1001100 | 20 | 1010001 |
| 8 | 0101100 | 21 | 1001001 |
| 9 | 0011100 | 22 | 0101001 |
| 10 | 1100010 | 23 | 0011001 |
| 11 | 1010010 | 24 | 1000101 |
| 12 | 1001010 | 25 | 0100101 |
| 13 | 0101010 | | |

The translator circuit includes 7 cores $C'_1$ to $C'_7$ made in a magnetic material having a substantially rectangular hysteresis loop and each of its inputs $E_1$ to $E_{25}$ is connected to ground via a series circuit including a diode *d*, three set windings *f* and a common switch S which is normally open but which is closed when a translating or encoding operation is taking place. Hereby some set windings *f* are common to a plurality of series circuits extending between an input $E_{1-25}$ and the common ground. The windings which may be taken in common may be easily found by considering the above scheme.

Indeed, therefrom it follows, for instance that the numerical values included in the groups 2 to 4, 5 to 9, 10 to 18 and 19 to 25 each have a "1" in the fourth, fifth, sixth and seventh (from left to right) columns respectively. Hence, when using the cores $C'_1$ to $C'_7$ for encoding the binary digits of the first, second . . . , seventh column and reckoning with the fact that with a "1" there corresponds a set winding, the groups 2 to 4, 5 to 9, 10 to 18 and 19 to 25 may have a common set winding on the cores $C'_4$, $C'_5$, $C'_6$ and $C'_7$ respectively.

One may proceed further in the same way and so one will finally obtain the translator circuit shown which includes 41 windings instead of the 75 which would be required when no windings would be common to the above series circuits extending between the inputs $E_{1-5}$ and the common ground.

It should be noted that the use of common windings by the above series circuits is only possible in a translator circuit which translates a numerical code in a constant weight binary code. Indeed, in this case only one input is activated at the time and each series circuit then includes the same number of windings and the points of the circuits which are commoned are in fact equipotential points.

As described above, when a time slot is found free one of the outputs $O_1$ to $O_{25}$ of the lock-out circuit is activated, whereas when all the time slots are busy the output $O_{26}$ is activated. With the winding sense of the output windings shown, this activating signal is however not able to reach the translator circuit or to the above bistate device due to the presence of the diodes *d* and *d'*. On the contrary, when the above reset source $RS_1$ is operated the core $C_{1-26}$ which has been set in the lock-out circuit is reset and an output signal appears in the output winding wound on this core in a direction which renders conductive the associated diode *d* or *d'*. In the case one of the cores $C_{1-25}$ is thus reset, three of the cores $C'_1$ to $C'_7$ will be set by a current flowing in their set windings *f* and an output signal will appear in the output windings *k* on these set cores. In this manner the code number of the free time channel is obtained and this code number may then be transmitted for further operations to a register circuit, as described in the above mentioned Belgian Pat. 596,196 (J. Masure 2). In the case the core $C_{26}$ is reset the bistate device connected to the output $O_{26}$ will be brought in its 1-condition, thus indicating that all the time slots are busy.

In order to reset the cores $C'_1$ to $C'_7$ a reset pulse should be applied to the reset windings 1 by a reset signal source $RS_2$ between the terminals of which these reset windings are connected in series, one of these terminals being grounded.

It should be noted that instead of first setting one of the cores $C_1$ to $C_{25}$ and only afterwards setting three of the cores $C'_1$ to $C'_7$, one could also simultaneously set these four cores by slightly modifying the output circuits of the lock-out circuit. However, in this case each of the input signal sources should be capable of supplying a power which is not only able to set one of the cores $C_1$ to $C_{25}$, as is now the case, but simultaneously also three of the cores $C'_1$ to $C'_7$. Hence 25 sources capable of supplying a relatively large power would be necessary. In the above circuit however only 25 sources of a relatively small power are required for setting one of the cores $C_1$ to $C_{25}$ and a single reset source $RS_1$ is used for setting three of the cores $C'_1$ to $C'_7$.

As described in the above mentioned Belgian Pat. 596,196 it is necessary to decode the code indication of a time slot after the latter is no longer in use. Again referring to FIG. 1 also the latter shows a decoder circuit which is adapted to decode a complementary 3-out-of-7 binary code indication of a time slot into a numerical value 1 to 25. This decoder circuit uses the cores $C_1$ to $C_{25}$ and is provided with seven inputs $D_1$ to $D_7$ each of which is connected on the one hand to one terminal of an input signal source (not show) and on the other hand to the other grounded terminal of this signal source via the series connection of an inhibition wire *w* and a set wire *t*. Each inhibition wire is threaded through a number of cores $C_1$ to $C_{25}$ in such a manner that on each of these cores there are wound a different set of inhibition windings *x*, each set including 3 inhibition windings. The set wire $t$ is threaded through all the cores so that a set winding $y$ is wound on each core.

As mentioned above, the code applied to the inputs $D_1$ to $D_7$ is a complementary 3-out-of-7 code, i.e. a code wherein 4 elements are 1 and 3 elements are 0, to each 0 corresponding an inhibition winding e.g. the code 0010111 represents the value 2 and therefore three inhibition windings $x$ are wound on the core 2 and are connected to the inputs $D_1$, $D_2$ and $D_4$ respectively. In this manner, a core may only be set by the current flowing in its set winding $y$ when no current flows in its inhibition windings.

While the principles of the invention have been described above in connection with specific apparatus, it is to be clearly understood that this description is made only by way of example and not as a limitation on the scope of the invention.

What is claimed is:

1. A translator circuit adapted to translate a numerical value in an $n$-out-of-$m$ constant weight binary code comprising:

$m$ cores and $p$ inputs, each of said $p$ inputs is coupled to a fixed DC potential by a series circuit;

said series circuit including a diode, $n$ set windings which are wound on $n$ of said $m$ cores, and a common switch which is activated for a translating operation;

reset windings on each of said $m$ cores and coupled to a reset signal source;

output windings on each of said $m$ cores, said output windings producing an output signal indicative of the set cores; and a portion of said $n$ windings are common to a plurality of said series circuits, whereby the current flowing in the $n$ series connected windings when activating an input is the same for any input activated.

References Cited

UNITED STATES PATENTS

| | | | |
|---|---|---|---|
| 2,907,019 | 9/1959 | Merlin | 349—347 |
| 3,023,405 | 2/1962 | Scott | 340—347 |
| 3,222,669 | 12/1965 | Lee | 340—347 |

MAYNARD R. WILBUR, Primary Examiner

J. GLASSMAN, Assistant Examiner

U.S. Cl. X.R.

179—18